US009308870B2

(12) United States Patent
Yang et al.

(10) Patent No.: US 9,308,870 B2
(45) Date of Patent: Apr. 12, 2016

(54) VEHICLE AND VEHICLE STEP APPARATUS

(71) Applicant: T-Max (Hangzhou) Industrial Co., Ltd., Hangzhou, Zhejiang (CN)

(72) Inventors: Huizhong Yang, Hangzhou (CN); Zhaobo Qing, Hangzhou (CN)

(73) Assignee: T-MAX (HANGZHOU) INDUSTRIAL CO., LTD, Hangzhou (CN)

( * ) Notice: Subject to any disclaimer, the term of this patent is extended or adjusted under 35 U.S.C. 154(b) by 0 days.

(21) Appl. No.: 14/501,674

(22) Filed: Sep. 30, 2014

(65) Prior Publication Data

US 2015/0274079 A1  Oct. 1, 2015

(30) Foreign Application Priority Data

Mar. 26, 2014 (CN) .......................... 2014 1 0116215

(51) Int. Cl.
*B60R 3/00* (2006.01)
*B60R 3/02* (2006.01)
(52) U.S. Cl.
CPC ........................................ *B60R 3/02* (2013.01)
(58) Field of Classification Search
CPC ............. B60R 3/02; B60R 3/002; B60P 3/36; E06C 7/003; H01H 36/0046
See application file for complete search history.

(56) References Cited

U.S. PATENT DOCUMENTS

| 32,460 | A | 6/1861 | Betts |
| 115,664 | A | 6/1871 | Vollhardt |
| 125,235 | A | 4/1872 | Wells |
| 752,031 | A | 2/1904 | Chadwick |
| 1,052,364 | A | 2/1913 | Morris |
| 1,146,559 | A | 7/1915 | Fuller |
| 1,182,563 | A | 5/1916 | Hild et al. |
| 1,487,408 | A | 3/1924 | Tichy et al. |
| 2,118,557 | A | 5/1938 | Hamilton |
| 2,423,961 | A | 7/1947 | Buxton |
| 2,764,422 | A | 9/1956 | McDonald |
| 3,494,634 | A | 2/1970 | Paula |
| 3,528,574 | A | 9/1970 | Denner et al. |
| 3,833,240 | A | 9/1974 | Weiler |
| 3,887,217 | A | 6/1975 | Thomas |
| 3,955,827 | A | 5/1976 | Wonigar |
| 4,073,502 | A | 2/1978 | Frank et al. |
| 4,110,673 | A | * | 8/1978 | Magy ................... H02H 7/0851 105/444 |

(Continued)

FOREIGN PATENT DOCUMENTS

CA  2438489 A1  10/2002
CA  2463717 A1  5/2003

(Continued)

*Primary Examiner* — Brodie Follman
(74) *Attorney, Agent, or Firm* — Howard & Howard Attorneys PLLC

(57) ABSTRACT

A vehicle and a vehicle step apparatus are provided. The vehicle includes: a body; a door; and a vehicle step apparatus including: an extending and retracting device mounted on the body, a motor configured to drive the extending and retracting device to extend or to retract, a detector configured to detect an opening-closing state of the door and to generate a signal indicating the opening-closing state of the door, an emitter coupled with the detector and configured to emit the signal, a receiver configured to receive the signal from the emitter via a wireless communication, a controller coupled with the motor and the receiver respectively and configured to control the motor to drive the extending and retracting device according to the signal.

6 Claims, 4 Drawing Sheets

(56) References Cited

U.S. PATENT DOCUMENTS

| | | | | |
|---|---|---|---|---|
| 4,116,457 | A | 9/1978 | Nerem et al. | |
| 4,982,974 | A | 1/1991 | Guidry | |
| 5,085,450 | A * | 2/1992 | DeHart, Sr. | B60R 3/02 280/166 |
| 5,538,269 | A | 7/1996 | McDaniel et al. | |
| 5,547,040 | A * | 8/1996 | Hanser | B60R 3/02 182/127 |
| 5,842,709 | A | 12/1998 | Maccabee | |
| 6,027,090 | A | 2/2000 | Liu | |
| 6,149,172 | A * | 11/2000 | Pascoe | B60R 3/02 280/163 |
| 6,179,312 | B1 * | 1/2001 | Paschke | B60R 3/02 105/444 |
| 6,325,397 | B1 * | 12/2001 | Pascoe | B60R 3/02 280/163 |
| 6,641,158 | B2 * | 11/2003 | Leitner | B60R 3/02 105/443 |
| 6,830,257 | B2 | 12/2004 | Leitner | |
| 6,834,875 | B2 * | 12/2004 | Leitner | B60R 3/02 105/447 |
| 6,926,295 | B2 * | 8/2005 | Berkebile | B60R 3/02 280/163 |
| 6,938,909 | B2 | 9/2005 | Leitner | |
| 6,942,233 | B2 | 9/2005 | Leitner et al. | |
| 7,007,961 | B2 | 3/2006 | Leitner et al. | |
| 7,017,927 | B2 * | 3/2006 | Henderson | B60R 3/02 280/163 |
| 7,055,839 | B2 | 6/2006 | Leitner | |
| 7,070,194 | B2 * | 7/2006 | Garland | B60R 3/02 280/163 |
| 7,118,120 | B2 * | 10/2006 | Lee | B60R 3/02 280/163 |
| 7,163,221 | B2 | 1/2007 | Leitner | |
| 7,287,771 | B2 * | 10/2007 | Lee | B60R 3/02 280/163 |
| 7,318,596 | B2 * | 1/2008 | Scheuring, III | B60R 3/02 280/163 |
| 7,367,574 | B2 * | 5/2008 | Leitner | B60R 3/02 280/163 |
| 7,377,531 | B2 * | 5/2008 | Fabiano | B60R 3/02 182/88 |
| 7,380,807 | B2 | 6/2008 | Leitner | |
| 7,398,985 | B2 | 7/2008 | Leitner et al. | |
| 7,413,204 | B2 | 8/2008 | Leitner | |
| 7,441,790 | B2 | 10/2008 | Lechkun | |
| 7,445,221 | B2 * | 11/2008 | Kobayashi | B60R 3/02 280/163 |
| 7,469,916 | B2 * | 12/2008 | Watson | B60R 3/02 280/163 |
| 7,487,986 | B2 * | 2/2009 | Leitner | B60R 3/02 280/163 |
| 7,513,565 | B2 * | 4/2009 | Watson | B60R 3/02 280/163 |
| 7,566,064 | B2 | 7/2009 | Leitner et al. | |
| 7,584,975 | B2 * | 9/2009 | Leitner | B60R 3/02 280/163 |
| 7,594,672 | B2 * | 9/2009 | Piotrowski | B60R 3/02 280/163 |
| 7,621,546 | B2 | 11/2009 | Ross et al. | |
| 7,712,755 | B2 * | 5/2010 | Yang | B60R 3/02 280/163 |
| 7,740,260 | B2 | 6/2010 | VanBelle et al. | |
| 7,740,261 | B2 | 6/2010 | Leitner et al. | |
| 7,744,106 | B2 | 6/2010 | VanBelle et al. | |
| 8,042,821 | B2 * | 10/2011 | Yang | B60R 3/02 280/163 |
| 8,052,162 | B2 * | 11/2011 | Yang | B60R 3/02 280/163 |
| 8,136,826 | B2 * | 3/2012 | Watson | B60R 3/02 280/163 |
| 8,205,901 | B2 | 6/2012 | Yang et al. | |
| 8,262,113 | B1 * | 9/2012 | Chafey | B60R 3/02 280/163 |
| 8,342,551 | B2 * | 1/2013 | Watson | B60R 3/02 280/163 |
| 8,373,550 | B2 * | 2/2013 | McKee | H02P 29/028 296/146.4 |
| 8,469,380 | B2 * | 6/2013 | Yang | B60R 3/02 182/127 |
| 8,602,431 | B1 * | 12/2013 | May | B60R 3/02 280/163 |
| 8,662,512 | B2 * | 3/2014 | May | B60R 3/02 280/163 |
| 8,833,782 | B2 * | 9/2014 | Huotari | B60R 3/02 280/163 |
| 8,882,033 | B2 * | 11/2014 | Rittner | A62B 7/14 128/202.26 |
| 2002/0113400 | A1 | 8/2002 | Leitner | |
| 2003/0184040 | A1 | 10/2003 | Leitner et al. | |
| 2004/0084868 | A1 | 5/2004 | Leitner et al. | |
| 2004/0124601 | A1 | 7/2004 | Leitner | |
| 2005/0077697 | A1 | 4/2005 | Leitner | |
| 2005/0087951 | A1 | 4/2005 | Leitner et al. | |
| 2005/0104318 | A1 | 5/2005 | Lee et al. | |
| 2005/0151340 | A1 | 7/2005 | Leitner | |
| 2005/0179227 | A1 | 8/2005 | Leitner | |
| 2005/0280242 | A1 * | 12/2005 | Fabiano | B60R 3/02 280/164.1 |
| 2006/0091638 | A1 | 5/2006 | Leitner et al. | |
| 2006/0125204 | A1 | 6/2006 | Leitner et al. | |
| 2006/0202441 | A1 | 9/2006 | Leitner | |
| 2007/0108720 | A1 | 5/2007 | Leitner | |
| 2007/0159308 | A1 * | 7/2007 | Johnston | B60P 3/36 340/425.5 |
| 2007/0278760 | A1 | 12/2007 | VanBelle et al. | |
| 2008/0025829 | A1 * | 1/2008 | Denison | A61G 3/061 414/537 |
| 2008/0054586 | A1 | 3/2008 | Lechkun | |
| 2008/0100024 | A1 | 5/2008 | Leitner et al. | |
| 2008/0100025 | A1 | 5/2008 | Leitner et al. | |
| 2008/0116653 | A1 | 5/2008 | Piotrowski | |
| 2008/0191445 | A1 | 8/2008 | Yang et al. | |
| 2008/0271936 | A1 | 11/2008 | Kuntze et al. | |
| 2008/0290626 | A1 | 11/2008 | Leitner | |
| 2009/0072508 | A1 | 3/2009 | Leitner et al. | |
| 2009/0250896 | A1 | 10/2009 | Watson | |
| 2010/0059962 | A1 | 3/2010 | Leitner et al. | |
| 2012/0098231 | A1 * | 4/2012 | Huotari | B60R 3/02 280/166 |
| 2015/0188345 | A1 * | 7/2015 | Sohn | B60R 16/027 307/9.1 |
| 2015/0274079 | A1 * | 10/2015 | Yang | B60R 3/02 280/166 |

FOREIGN PATENT DOCUMENTS

| | | |
|---|---|---|
| CA | 2475492 A1 | 1/2005 |
| CN | 1652955 A | 8/2005 |
| CN | 101020434 A | 8/2007 |
| CN | 101497325 A | 8/2009 |
| JP | 8132967 | 5/1996 |
| WO | 02085670 A2 | 10/2002 |
| WO | 03039910 A1 | 5/2003 |

* cited by examiner

VEHICLE AND VEHICLE STEP APPARATUS

CROSS-REFERENCE TO RELATED APPLICATION

This application is based upon and claims priority to Chinese Patent Application No. 201410116215.X, filed on Mar. 26, 2014.

BACKGROUND OF THE INVENTION

1. Field of the Invention

The present invention relates, generally, to automotive vehicles and, more specifically, to a vehicle and a vehicle step apparatus.

2. Description of the Related Art

Vehicle step apparatus known in the art are mounted on a chassis of a vehicle and are configured to assist passengers to get on or off the vehicle. A control circuit of the vehicle step apparatus is integrated in a control system of the vehicle, that is, a control signal of the control circuit accesses a CAN (Controller Area Network) bus of the vehicle. Because of technical confidentiality, many vehicle manufacturers may set protection measures for a communication system of the vehicle so as to prohibit an access of foreign signals.

Thus, where the control signal of the control circuit of the vehicle step apparatus cannot access the bus of the vehicle, mounting the vehicle step on the vehicle by integrating the control circuit of the vehicle to the bus of the vehicle becomes problematic. Moreover, in order to integrate the control circuit of the vehicle step apparatus in the bus of the vehicle, modification of the bus of the vehicle may be required, thereby increasing the cost and the complexity of the operation, as well as reducing the reliability of the vehicle.

SUMMARY OF THE INVENTION

The present invention overcomes the disadvantages in the related art in a vehicle including a vehicle step apparatus. The vehicle step apparatus can control an extending and retracting device thereof independently without increasing a burden of a control system of the vehicle, and the vehicle is not required to be modified to mount the vehicle step apparatus. Thus, the vehicle step apparatus is easy to mount on the vehicle without reducing the reliability.

The vehicle includes a body, a door, and a vehicle step apparatus. The vehicle step apparatus includes: an extending and retracting device mounted on the body, a motor configured to drive the extending and retracting device to extend or to retract, a detector configured to detect an opening-closing state of the door and to generate a signal indicating the opening-closing state of the door, an emitter coupled with the detector and configured to emit the signal, a receiver configured to receive the signal from the emitter via a wireless communication, a controller coupled with the motor and the receiver respectively and configured to control the motor to drive the extending and retracting device according to the signal. The vehicle step apparatus obtains the signal indicating the opening-closing state of the door via the wireless communication, and thus controls the extending and retracting device according to the signal. The vehicle step apparatus controls the extending and retracting device independently without increasing the burden of the control system of the vehicle. In addition, the vehicle step apparatus is easy to mount and to control and is suitable for any type of vehicle, especially where the vehicle includes a communication system that prohibits access of foreign signals.

The detector may include at least one of a micro-switch and an optical coupler. The vehicle step apparatus may further include a power source module coupled with the detector and the emitter and configured to supply power to the detector and the emitter, respectively. In one embodiment, the vehicle may further include a storage battery coupled with the receiver and the controller, configured to supply power to the receiver and the controller, respectively. The receiver and the controller may be integral with each other. In one embodiment, the emitter is disposed adjacent to the door, and the receiver and the controller are disposed in an engine compartment. In one embodiment, the vehicle further includes a display coupled with the controller and configured to display, under a control of the controller, the opening-closing state of the door and an extending-retracting state of the extending and retracting device. By displaying the extending-retracting state of the extending and retracting device, the state of a step member can be monitored intuitively, thus facilitating getting on or off the vehicle.

The present invention is also directed toward a vehicle step apparatus, including: an extending and retracting device; a motor configured to drive the extending and retracting device to extend or to retract; a detector configured to detect an opening-closing state of a door of the vehicle and to generate a signal indicating the opening-closing state of the door; an emitter coupled with the detector and configured to emit the signal; a receiver configured to receive the signal from the emitter via a wireless communication; a controller coupled with the motor and the receiver respectively and configured to control the motor to drive the extending and retracting device according to the signal. The signal indicating the opening-closing state of the door is obtained via the wireless communication between the emitter and the receiver, and thus the controller controls the extending and retracting device according to the signal. In order to mount a vehicle step apparatus on the vehicle, a control circuit of the vehicle step apparatus is not required to be integrated in a CAN bus of the vehicle. The vehicle step apparatus can be controlled by an independent controller, without increasing the burden of the control system of the vehicle. In addition, the vehicle step apparatus has a simple structure and is easy to mount. The detector may include at least one of a micro-switch and an optical coupler. In one embodiment, the vehicle step apparatus further includes a power source module coupled with the detector and the emitter and configured to supply power to the detector and the emitter, respectively. The vehicle may further include a storage battery coupled with the receiver and the controller, configured to supply power to the receiver and the controller, respectively. The receiver and the controller may be integral with each other. The controller may control the motor in a wireless or wire communication manner.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
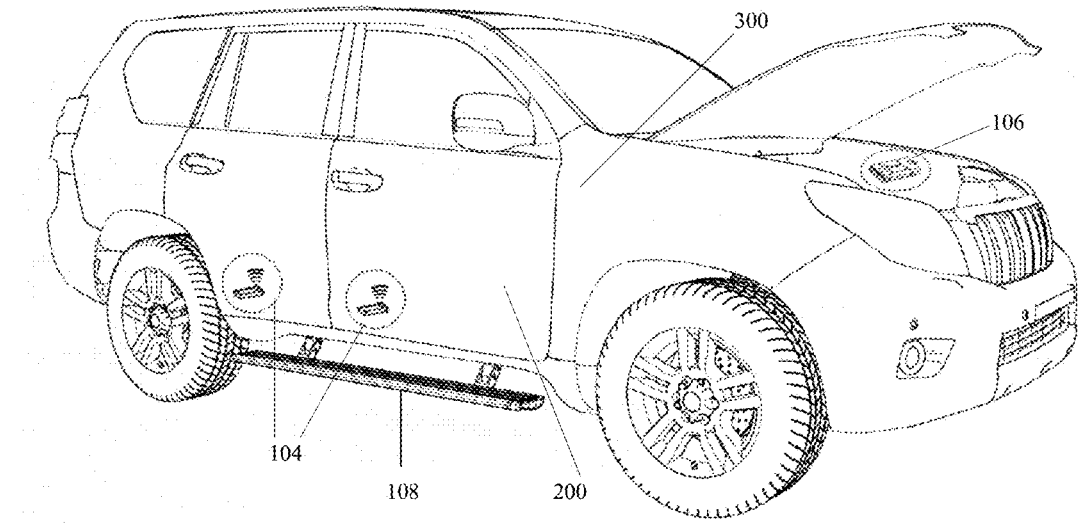
FIG. 1 is a schematic view of a vehicle according to one embodiment of the present invention.

Reference will be made in detail to embodiments of the present invention. Embodiments of the present invention will be shown in drawings, in which the same or similar elements and the elements having same or similar functions are denoted by like reference numerals throughout the descriptions. The embodiments described herein according to drawings are explanatory and illustrative, not construed to limit the present invention.

The following description provides a plurality of embodiments or examples configured to achieve different structures of the present invention. In order to simplify the publication of the present invention, components and dispositions of the particular embodiment are described in the following, which are only explanatory and not construed to limit the present invention. In addition, the present invention may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include one embodiment formed by the first and second characteristic contacted directly, and also may include another embodiment formed between the first and the second characteristic, in which the first characteristic and the second characteristic may not contact directly.

In the description of the present invention, unless specified or limited otherwise, it should be noted that, terms "mounted," "connected" and "coupled" may be understood broadly, such as electronic connection or mechanical connection, inner communication between two elements, direct connection or indirect connection via intermediary. Those having ordinary skills in the art should understand the specific meanings in the present invention according to specific situations. With reference to the following descriptions and drawings, these and other aspects of embodiments of the present invention will be distinct. In the descriptions and drawings, some particular embodiments are described in order to show the principles of embodiments according to the present invention, however, it should be appreciated that the scope of embodiments according to the present invention is not limited. On the contrary, embodiments of the present invention include all the changes, alternatives, and modifications falling into the scope of the spirit and principles of the attached claims.

Referring now to the drawings, FIG. 1 shows a schematic view of a vehicle 1000 according to one embodiment of the present invention. The vehicle 1000 includes a body 300, a door 200 and a vehicle step apparatus 100.

Figure 2:
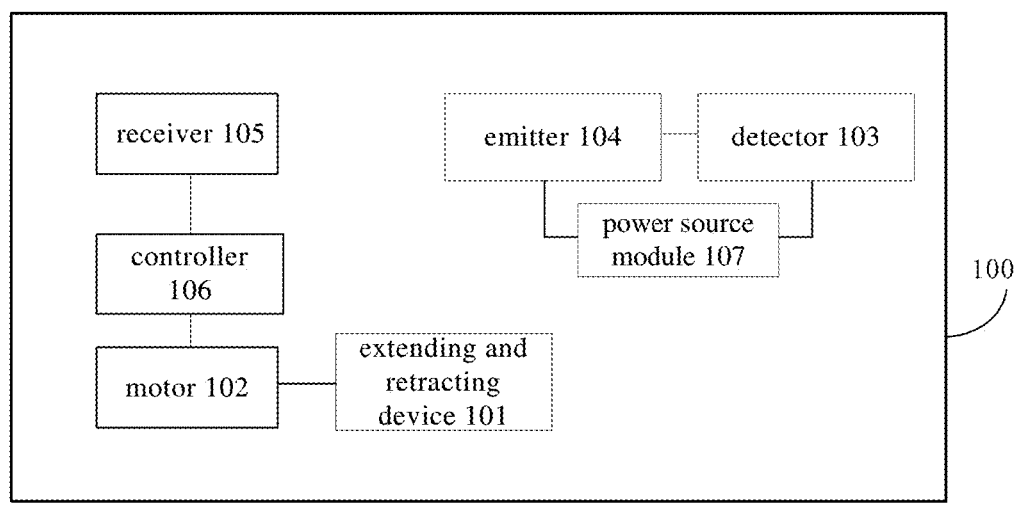
FIG. 2 is a block diagram of a vehicle step apparatus of the vehicle of FIG. 1.

FIG. 2 shows a block diagram of a vehicle step apparatus 100 of the vehicle 1000 of FIG. 1. The vehicle step apparatus 100 includes an the extending and retracting device 101, a motor 102, a step member 108, a detector 103, an emitter 104, a receiver 105, and a controller 106. The extending and retracting device 101 is mounted on the body 300. The motor 102 is coupled with and drives the extending and retracting device 101 to extend or retract.

The detector 103 is used to detect an opening-closing state of the door 200 and thereby to generate a signal indicating the opening-closing state of the door 200. Here, the opening-closing state of the door 200 means that the door 200 is opened or closed. The emitter 104 is coupled with the detector 103, (for example, the emitter 104 is disposed adjacent to the door 200), and used to emit the signal. The receiver 105 is used to receive the signal from the emitter 104 via wireless communication. The controller 106 is coupled with the motor 102 and the receiver 105 respectively, and controls the motor 102 to drive the extending and retracting device 101 according to the signal.

In one embodiment, as shown in FIG. 2, the vehicle step apparatus 100 further includes a power source module 107, and the power source module 107 is coupled with the detector 103 and the emitter 104 respectively and is used to supply power to the detector 103 and the emitter 104.

Figure 3:
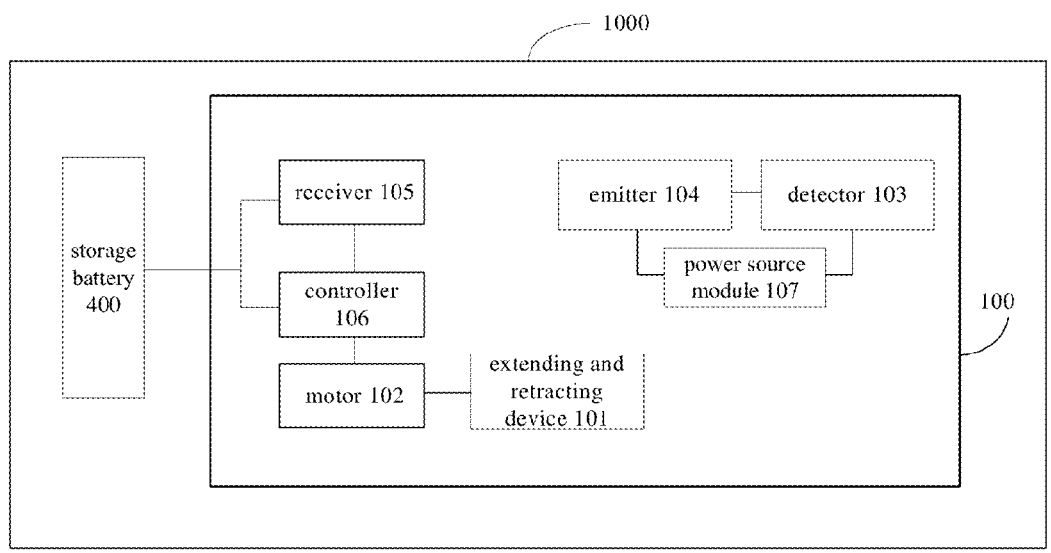
FIG. 3 is a block diagram of a vehicle according to one embodiment of the present invention.

FIG. 3 shows a block diagram of the vehicle 1000 of FIG. 1. As shown in FIG. 3, the vehicle 1000 further includes a storage battery 400. The storage battery 400 is coupled with the receiver 105 and the controller 106 respectively and is used to supply power to the receiver 105 and the controller 106.

Figure 4:
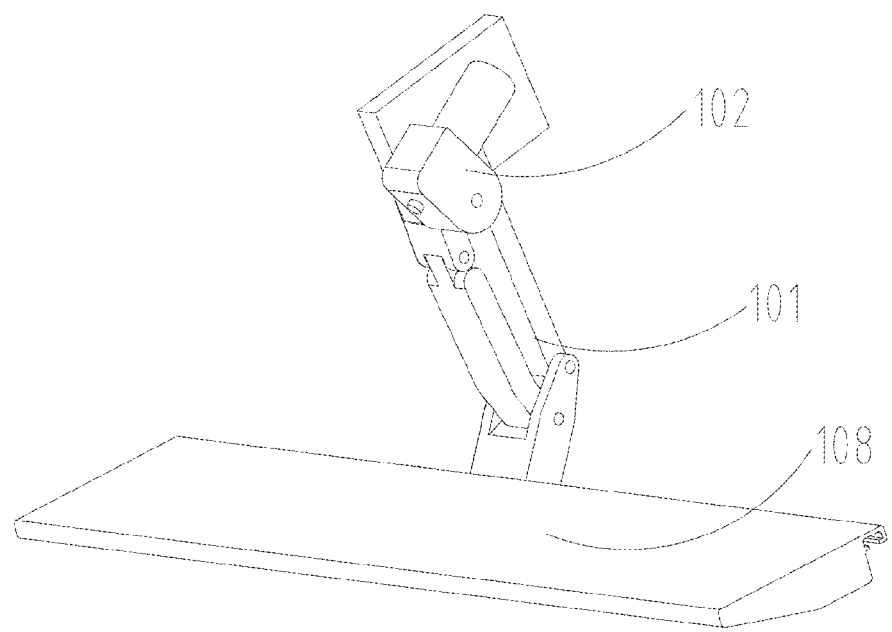
FIG. 4 is a schematic view showing an extending and retracting device in an extending state according to one embodiment of the present invention.
Figure 5:
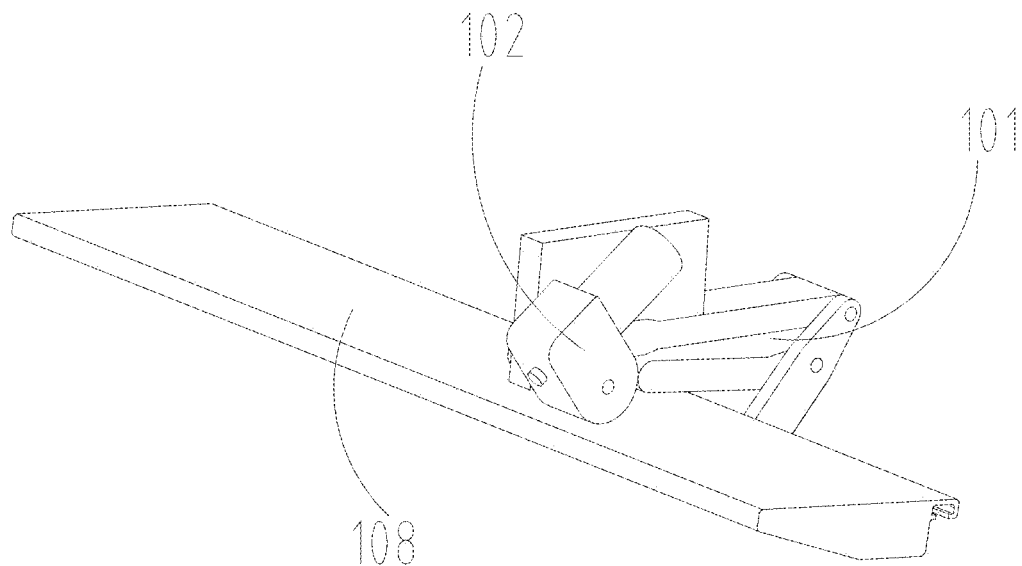
FIG. 5 is a schematic view showing the extending and retracting device of FIG. 4 in a retracting state according to one embodiment of the present invention.

FIG. 4 shows a schematic view of an extending and retracting device 101 in an extending state, and FIG. 5 shows schematic view of the extending and retracting device 101 in a retracting state. In one embodiment, as shown in FIG. 4 and FIG. 5, the controller 106 controls the motor 102 according to the signal indicating the opening-closing state of the door 200, so as to drive the extending and retracting device 101 to extend and retract, thereby to drive the step member 108 to extend and retract, thus facilitating passengers getting on or off the vehicle 1000.

Specifically, when the door 200 is opened, the controller 106 may control the motor 102 to rotate forwardly so as to drive the extending and retracting device 101 to extend. When the door 200 is closed, the controller 106 controls the motor 102 to rotate backwardly so as to drive the extending and retracting device 101 to retract. For example, as shown in Table 1 below (a truth table of a wireless communication between the emitter 104 and the receiver 105), when the detector 103 detects that the door 200 is opened, a signal X1 indicating an opening state of the door 200 is input to the emitter 104, and the receiver 105 correspondingly outputs a high level V+ to the controller 106. When the detector 103 detects that the door 200 is closed, a signal X2 indicating a closing state of the door 200 is input to the emitter 104, and the receiver 105 correspondingly outputs a low level V− to the controller 106. The controller 106 controls the motor 102 according to the high level V+ or the low level V−, so as to control the extending and retracting device 101 to extend or retract, thus controlling the step member 108 to extend or retract.

When the door 200 is detected to be opened, the detector 103 (such as a micro-switch or an optical coupler) sends the signal indicating an opening state of the door 200 to the emitter 104. Table 2, shown below, illustrates a corresponding relationship between input and output signals of the emitter 104. For example, when the door 200 is opened, the signal X1 indicating the opening state of the door 200 is input to the emitter 104, and the emitter 104 converts the signal X1 to a wireless signal Y1 indicating the opening state of the door 200 and emits the wireless signal Y1 to the receiver 105 via the wireless communication such as WIFI. Table 3, shown below, illustrates a corresponding relationship between input and output signals of the receiver 105. For example, the receiver 105 receives the wireless signal Y1, converts the wireless signal Y1 to an output signal such as a high level V+ and outputs it to the controller 106. After receiving the high level V+, the controller 106 controls the motor 102 to rotate forwardly to drive the extending and retracting device 101 to extend, thus controlling the step member 108 to extend.

TABLE 1

| Input (X) | Output (V) |
|---|---|
| Signal indicating opening state of door (X1) | High level (V+) |
| Signal indicating closing state of door (X2) | Low level (V−) |

TABLE 2

| | Signal state | |
|---|---|---|
| Input signal | Signal indicating opening state of door (X1) | Signal indicating closing state of door (X2) |
| Output signal | Wireless signal indicating opening state of door (Y1) | Wireless signal indicating closing state of door (Y2) |

TABLE 3

| | Signal state | |
|---|---|---|
| Input signal | Wireless signal indicating opening state of door (Y1) | Wireless signal indicating closing state of door (Y2) |
| Output signal | High level (V+) | Low level (V−) |

When the door 200 is detected to be closed, the detector 103 sends the signal indicating closing state of the door 200. As shown in Table 2, when the door 200 is closed, the signal X2 indicating the closing state of the door 200 is input to the emitter 104, and the emitter 104 converts the signal X2 to a wireless signal Y2 indicating the closing state of the door 200 and emits the wireless signal Y2 to the receiver 105 via wireless communication, such as WIFI. The receiver 105 receives the wireless signal Y1, converts the wireless signal Y2 to an output signal such as a low level V− and outputs it to the controller 106. After receiving the low level V−, the controller 106 controls the motor 102 to rotate backward to drive the extending and retracting device 101 to retract, thus controlling the step member 108 to retract.

Figure 6:
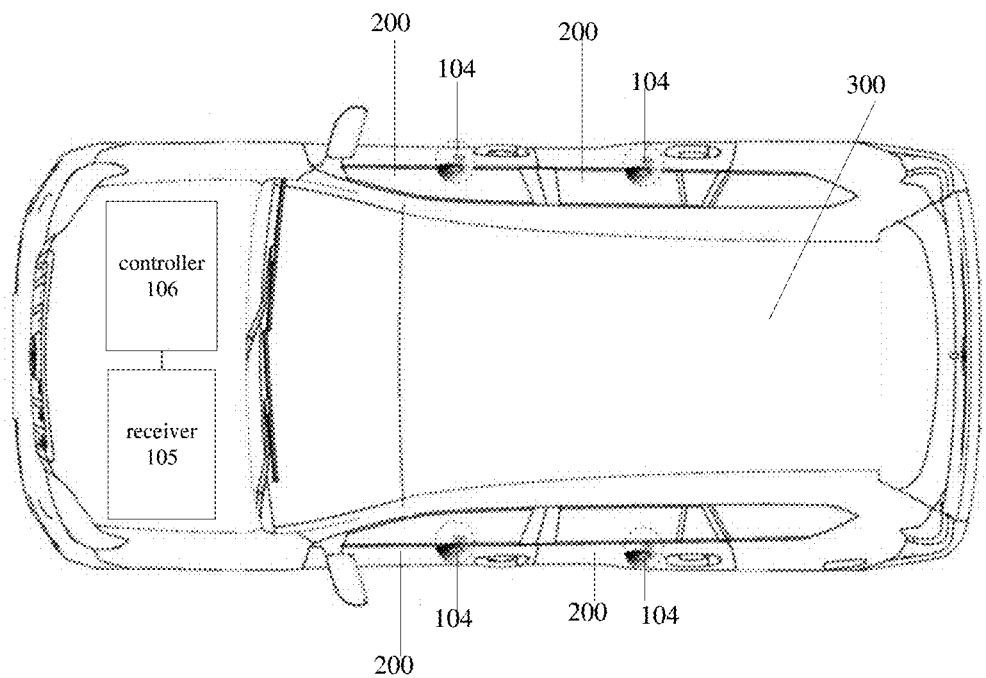
FIG. 6 is a schematic view of a vehicle according to one embodiment of the present invention.

In one embodiment, as shown in FIG. 6, the receiver 105 and the controller 106 may be disposed in an engine compartment of the vehicle 1000, and the receiver 105 and the controller 106 may be integral with each other. Furthermore, those having ordinary skill in the art will appreciates that, although only two emitters 104 corresponding to two doors 200 are shown in FIG. 1, another two emitters 104 may also be mounted for other two doors 200, and the signal indicating the opening-closing state of each door 200 could be emitted via the emitter 104 to the receiver 105 corresponding to each door 200, thus realizing the wireless signal transmitting from multiple points to one point. Consequently, the controller 106 can control the corresponding the extending and retracting device 101 according to the signal indicating the opening-closing state of each door 200, so as to control the corresponding step member 108 to extend or retract.

Figure 7:
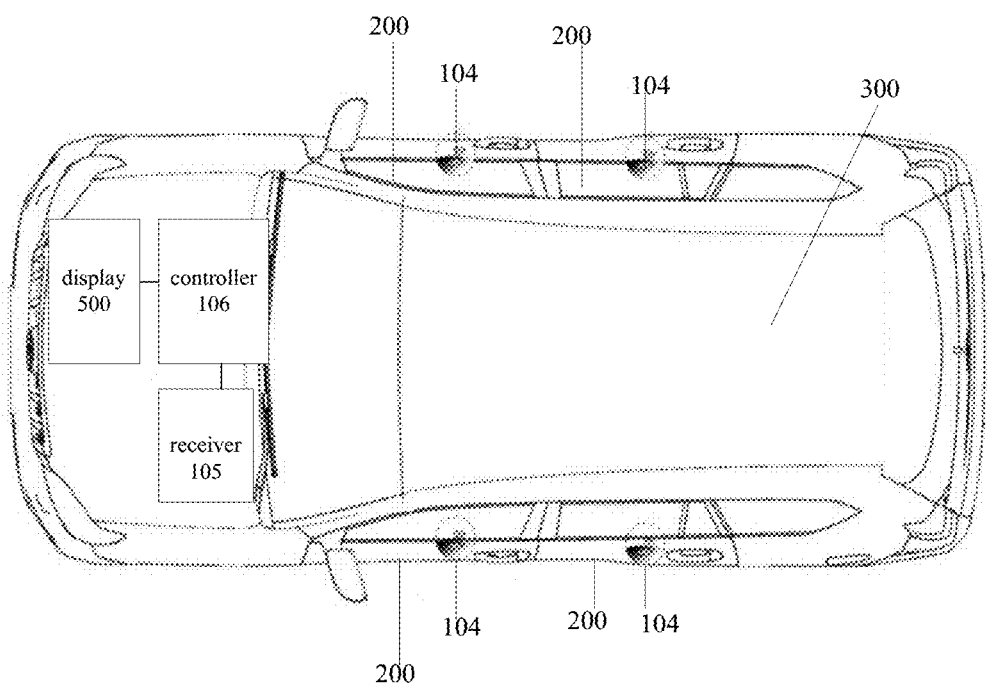
FIG. 7 is a schematic view of a vehicle according to one embodiment of the present invention.

In one embodiment, as shown in FIG. 7, the vehicle 1000 may further include a display 500. The display 500 is coupled with the controller 106 and is used to display, under a control of the controller 106, the opening-closing state of the door 200 and the extending-retracting state of the extending and retracting device 101, and thus users can observe the extending-retracting state of the step member 108 intuitively.

With the vehicle of the present invention, the vehicle step apparatus obtains the signal indicating the opening-closing state of the door via the wireless communication, and thus controls the extending and retracting device according to the signal. The vehicle step apparatus controls the extending and retracting device independently without increasing the burden of the control system of the vehicle and accessing the control system to the bus of the vehicle. In addition, by displaying the extending-retracting state of the extending and retracting device via the display, the state of the vehicle step apparatus can be obtained intuitively, thus facilitating getting on or off the vehicle. Moreover, the vehicle step apparatus is easy to mount and to control, and can be used in any type of vehicle, especially in vehicles with a communication system that prohibits an access of foreign signals. Furthermore, the vehicle is not required to be modified, thereby ensuring that the reliability of the vehicle is high.

As shown in FIG. 2, the vehicle step apparatus 100 includes an the extending and retracting device 101, a motor 102, a step member 108, a detector 103, an emitter 104, a receiver 105, and a controller 106. The motor 102 is used to drive the extending and retracting device 101 to extend or to retract. The detector 103 is used to detect an opening-closing state of the door 200 of a vehicle and to generate a signal indicating the opening-closing state of the door 200, in which the opening-closing state of the door 200 indicates that the door 200 is opened or closed. The emitter 104 is coupled with the detector 103 and is used to emit the signal indicating the opening-closing state of the door 200. The receiver 105 communicates with the emitter 104 via a wireless communication to receive the signal indicating the opening-closing state of the door 200 from the emitter 104. The controller 106 is coupled with the motor 102 and the receiver 105 respectively, and controls the motor 102 to drive the extending and retracting device 101 according to the signal indicating the opening-closing state of the door 200.

In one embodiment, as shown in FIG. 2, the vehicle step apparatus 100 further includes a power source module 107, and the power source module 107 is coupled with the detector 103 and the emitter 104 respectively and is used to supply power to the detector 103 and the emitter 104. As shown in FIG. 3, the vehicle further includes a storage battery 400. The storage battery 400 is coupled with the receiver 105 and the controller 106 respectively and is used to supply power to the receiver 105 and the controller 106.

In one embodiment, the controller 106 controls the motor 102 to rotate forwardly or backwardly to drive the extending and retracting device 101 to extend or retract, thus controlling the step member 108 to extend or retract, in which the controller 106 controls the motor 102 in a wireless or wire communication manner.

Specifically, in one embodiment, when the door 200 is opened, the controller 106 controls the motor 102 to rotate forwardly so as to drive the extending and retracting device 101 to extend. When the door 200 is closed, the controller 106 controls the motor 102 to rotate backwardly so as to thereby drive the extending and retracting device 101 to retract. For example, as shown in Table 1, when the detector 103 detects that the door 200 is opened, a signal X1 indicating an opening state of the door 200 is input to the emitter 104, and the receiver 105 outputs a high level V+ to the controller 106 correspondingly. When detector 103 detects that the door 200 is closed, a signal X2 indicating a closing state of the door 200 is input to the emitter 104, and the receiver 105 correspondingly outputs a low level V− to the controller 106. The controller 106 controls the motor 102 according to the high level V+ or the low level V−, so as to control the extending and retracting device 101 to extend or retract.

When the door 200 is detected to be opened, the detector 103 (such as a micro-switch or an optical coupler) sends the signal indicating an opening state of the door 200 to the emitter 104. Table 2 illustrates a corresponding relationship between input and output signals of the emitter 104. For example, when the door 200 is opened, the signal X1 indicating the opening state of the door 200 is input to the emitter 104, and the emitter 104 converts the signal X1 to a wireless signal Y1 indicating the opening state of the door 200 and emits the wireless signal Y1 to the receiver 105 via wireless communication, such as WIFI. Table 3 illustrates a corresponding relationship between input and output signals of the receiver 105. For example, the receiver 105 receives the wireless signal Y1, converts the wireless signal Y1 to an output signal such as a high level V+ and outputs it to the controller 106. After receiving the high level V+, the controller 106 controls the motor 102 to rotate forward to drive the extending and retracting device 101 to extend, thus controlling the step member 108 to extend.

When the door 200 is detected to be closed, the detector 103 sends the signal indicating closing state of the door 200. As shown in Table 2, when the door 200 is closed, the signal X2 indicating the closing state of the door 200 is input to the emitter 104, and the emitter 104 converts the signal X2 to a wireless signal Y2 indicating the closing state of the door 200 and emits the wireless signal Y2 to the receiver 105 via the wireless, communication such as WIFI. The receiver 105 receives the wireless signal Y1, converts the wireless signal Y2 to an output signal such as a low level V− and outputs it to the controller 106. After receiving the low level V−, the controller 106 controls the motor 102 to rotate backward to drive the extending and retracting device 101 to retract, thus controlling the step member 108 to retract.

In one embodiment, as shown in FIG. 6, the receiver 105 and the controller 106 may be integral with each other. For example, the receiver 105 and the controller 106 may be disposed in an engine compartment.

With the vehicle step apparatus of the present invention, the signal indicating the opening-closing state of the door is obtained via the wireless communication between the emitter and the receiver, such that the controller controls the extending and retracting device according to the signal. In order to mount the vehicle step apparatus 100 on the vehicle, a control circuit of the vehicle step apparatus is not required to be integrated in a CAN bus of the vehicle. The vehicle step apparatus 100 can be controlled by an independent controller, thus not increasing the burden of the control system of the vehicle. In addition, the vehicle step apparatus has a simple structure and is easy to mount.

Each function cell of the embodiments of the present invention may be integrated in one processing module, or each functional unit exists as an independent unit, or two or more cells are integrated in one processing module. The integrated module can be embodied in hardware, or software. If the integrated module is embodied in software and sold or used as an independent product, it can be stored in the computer readable storage medium.

The storage medium mentioned above may be, but is not limited to, read-only memories, magnetic disks or CD, etc.

Reference throughout this specification to "one embodiment," "one embodiment," "an example," "a specific example," or "some examples," indicates that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A vehicle, comprising:
    a body;
    a plurality of doors; and
    a vehicle step apparatus including:
    an extending and retracting device mounted on the body,
    a motor configured to drive the extending and retracting device to extend or to retract,
    a detector configured to detect an opening-closing state of each of the doors and to generate a signal indicating the opening-closing state of each of the doors,
    a plurality of emitters coupled with the detector and configured to emit the signals, and corresponding to the plurality of the doors respectively,
    a receiver configured to receive the signals from the emitters via wireless communication,
    a controller coupled with the motor and the receiver and configured to control the motor to drive the extending and retracting device according to the signals, the receiver and the controller being integral with each other so that the wireless signal transmitting from multiple points to one point is realized;
    a power source module coupled with the detector and the emitters, and configured to supply power to the detector and the emitters, and
    a step member connected with the extending and retracting device,
    wherein the vehicle further comprises a storage battery coupled with the receiver and the controller and configured to supply power to the receiver and the controller and
    a display coupled with the controller and configured to display, under a control of the controller, the opening-closing state of each of the doors and an extending-retracting state of the extending and retracting device.

2. The vehicle as set forth in claim 1, wherein the detector includes at least one of a micro-switch and/or an optical coupler.

3. The vehicle as set forth in claim 1, wherein the emitters are disposed adjacent to the doors respectively and the receiver and the controller are disposed in an engine compartment.

4. A step apparatus for a vehicle having a plurality of doors, comprising:
    an extending and retracting device;
    a motor configured to drive the extending and retracting device to extend or to retract;

a detector configured to detect an opening-closing state of each of the doors of the vehicle and to generate a signal indicating the opening-closing state of each of the doors;

a plurality of emitters coupled with the detector and configured to emit the signals, and corresponding to the plurality of the doors respectively;

a receiver configured to receive the signal from the emitter via wireless communication;

a controller coupled with the motor and the receiver and configured to control the motor to drive the extending and retracting device according to the signal, the receiver and the controller being integral with each other so that the wireless signal transmitting from multiple points to one point is realized;

a power source module coupled with the detector and the emitters, and configured to supply power to the detector and the emitters, and a step member connected with the extending and retracting device, wherein the vehicle further comprises a storage battery coupled with the receiver and the controller and configured to supply power to the receiver and the controller and a display coupled with the controller and configured to display, under a control of the controller, the opening-closing state of each of the doors and an extending-retracting state of the extending and retracting device.

5. The vehicle step apparatus as set forth in claim 4, wherein the detector includes at least one of a micro-switch and/or an optical coupler.

6. The vehicle step apparatus as set forth in claim 4, wherein the controller controls the motor via wire communication.

* * * * *